US006283671B1

(12) United States Patent
Nutto

(10) Patent No.: US 6,283,671 B1
(45) Date of Patent: Sep. 4, 2001

(54) CONNECTING ELEMENT FOR PROVIDING A RELEASABLE CONNECTION BETWEEN TWO OBJECTS

(76) Inventor: Uwe Nutto, Boelckestrasse 19, D-79100 Freiburg (DE)

(*) Notice: Subject to any disclaimer, the term of this patent is extended or adjusted under 35 U.S.C. 154(b) by 0 days.

(21) Appl. No.: 09/282,831

(22) Filed: Mar. 31, 1999

Related U.S. Application Data

(63) Continuation of application No. PCT/EP97/05363, filed on Sep. 30, 1997.

(30) Foreign Application Priority Data

Oct. 1, 1996 (DE) .............................................. 196 40 621

(51) Int. Cl.[7] .................................................... A44B 19/00

(52) U.S. Cl. .......................... 403/322.4; 403/245; 24/421

(58) Field of Search ................................ 403/321, 322.4, 403/DIG. 12, 353, 231, 245; 24/421, 334, 343, 3.11, 458, 499; 220/23.4, 23.2

(56) References Cited

U.S. PATENT DOCUMENTS

| | | | | |
|---|---|---|---|---|
| 1,727,871 | * | 9/1929 | Enerson | 24/421 |
| 1,796,771 | * | 3/1931 | Symons | 403/321 |
| 4,452,360 | * | 6/1984 | Barnes | 403/353 X |
| 5,579,971 | | 12/1996 | Chuang . | |
| 5,674,023 | * | 10/1997 | Williams | 403/231 |
| 5,779,429 | * | 7/1998 | Poole | 403/321 X |
| 5,803,655 | * | 9/1998 | Furuya | 403/321 X |
| 5,864,928 | * | 2/1999 | Matsushima | 24/421 |

FOREIGN PATENT DOCUMENTS

| | | |
|---|---|---|
| 25 25 169 A 1 | 12/1976 | (DE) . |
| 25 49 306 A 1 | 5/1977 | (DE) . |
| 33 30 221 A 1 | 3/1985 | (DE) . |
| 94 10 465 | 2/1995 | (DE) . |
| 296 04 228 U | 6/1996 | (DE) . |
| 195 31 836 C2 | 3/1997 | (DE) . |
| WO 93/24797 | 12/1993 | (WO) . |

* cited by examiner

*Primary Examiner*—Lynne H. Browne
*Assistant Examiner*—John R. Cottingham
(74) *Attorney, Agent, or Firm*—Akin, Gump, Strauss, Hauer & Feld, L.L.P.

(57) ABSTRACT

A connecting element provides a releasable connection between two objects, with a basic body element (2), for which an essentially L-shaped hook (4) is provided, with a hook bow (5) and a hook body (6) running essentially parallel to the basic body element (2). In this situation, the L-shaped hook (4) features in the area of the hook bow (5) a lateral cutout (7). To advantage, a longitudinal aperture (9) is provided in the bow (5) of the L-shaped hook (4) and in the basic body element (2), in which a locking bar can be inserted, which is jointed to a horizontal axis (11, 11') of the L-shaped hook (4). In this situation, the locking bar can be pivoted in against the force of a spring provided on the axis (11, 11'), into the area (8) between the hook body element (6) and the basic body element (2). In particular, the hook body element (6) can be provided with an aperture (18) in the section (20) located beneath the cutout (7), the shape and size of the said aperture being designed especially to accommodate the locking bar of a second connecting element.

7 Claims, 3 Drawing Sheets

CONNECTING ELEMENT FOR PROVIDING A RELEASABLE CONNECTION BETWEEN TWO OBJECTS

CROSS REFERENCE TO RELATED APPLICATION

This application is a continuation of International Application PCT/EP97/05363, filed Sep. 30, 1997, the disclosure of which is incorporated herein by reference.

BACKGROUND OF THE INVENTION

The invention relates to a connecting element for providing a releasable connection between two objects, with a basic body element, for which an essentially L-shaped hook is provided, with a hook body running essentially parallel to the basic body element.

Such connecting elements are used in general for a wide variety of applications. As an example of the simplest embodiment, for example, towel holders might be mentioned, which feature a basic body element, the rear face of which is, for example, adhesively bonded to a wall, or which is secured to the wall with the aid of a screw inserted through a borehole leading through the basic body element.

Such a connecting element is also used for the suspension of containers, such as bicycle panniers or beverage crates, and is known from applicant's German patent application P 195 31 836. The elements described therein feature the advantage that they can be used, for example, to connect containers together in pairs, such that, for instance, two bicycle panniers can be connected to form one single container, of the nature of a suitcase, for the purpose of transport without the bicycle, with the result that the user can keep one hand free.

The known connecting elements feature the disadvantage, however, for use under load, that the retaining surfaces of the hooks are arranged in a different manner in order for this connecting capacity to be achieved. This reduces the loading capacity, and leads to the use of large-volume connecting elements.

SUMMARY OF THE INVENTION

Taking this state of the art as a starting point, the invention is based on the objective of providing connecting elements of the type described in the Background which will allow, in a simpler manner, for containers provided with such connecting elements to be more simply combined, transported, and separated again.

This objective is resolved according to the invention by means of a connecting element to provide a separable connection of two objects with one another, having a basic body element, on which provision is made for a hook, essentially L-shaped, having a hook bow and a hook body running essentially parallel to the basic body element, wherein the L-shaped hook features a lateral cutout in the area of the hook bow.

As a result of the fact that material has been removed from the hook in the hook bow, two identical hooks, secured to two objects located opposite one another, such as the bicycle panniers referred to, are pushed into one another, in which situation, when the objects are raised, the load will then in each case rest essentially on half of each of the two hook bows.

In one advantageous embodiment, a longitudinal aperture is provided in the bow of the L-shaped hook and in the basic body element in which a locking bar can be fitted. This is hinged to a horizontal axis of the L-shaped hook, in which situation the locking bar can be pivoted against the force of a spring provided on the axis, into the space between the hook and the basic body element. In addition to this, the hook is not necessarily provided with an aperture, although this is preferential, the said aperture being provided in the section located beneath the cutout, the form and size of the aperture being designed especially to accommodate the locking bar of a second connecting element.

The application possibilities for such a hook are many and varied. Closure elements for jackets and coats can be created, which, thanks to the symmetry of the two connecting elements, can be used in a simple manner and are, in addition, attractive in form. These connecting elements can be used for tarpaulins for covering loads on heavy goods vehicles. These hooks can also be used for binding shoes and other similar applications.

In one embodiment, with which the connecting element is integrated with its basic body element in an object, the connecting element can be used in a large number of applications. One possibility relates to the use and transport of beverage crates. For products for which the manufacturer requires the facility of stacking, the basic body element integrated in the object is provided with an aperture, through which the hook of a second connecting element can be introduced, with which, to advantage, and in order that no hook elements project beyond the edge of a pallet, provision is made for a corresponding number of additional cutouts on the sides located opposite the connecting elements, into which the connecting elements of a second object of the same nature can be introduced and removed. As a result, a pallet layer of objects can be obtained, such as beverage crates in particular, without a single element projecting beyond the lateral edge of the crates.

In a smaller embodiment of the integrated connecting elements, plug-in cards and other computer elements can also be provided with these connecting elements.

A further possible application, which is not exhaustively described here, lies in the connection of individual chairs to form a row of chairs, in which situation the connecting elements are in each case provided on both sides of a chair.

A further advantage of the connecting elements lies in the fact that, in addition to connecting objects one above another, they can also be used to suspend an object from a bar, a tube, or a similar longitudinal or flattish element. This might, for example, be the frame of a luggage deposit box, a bicycle carrier frame, or a handrail.

Other advantageous embodiments are described below and in the sub-claims.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

Figure 1:
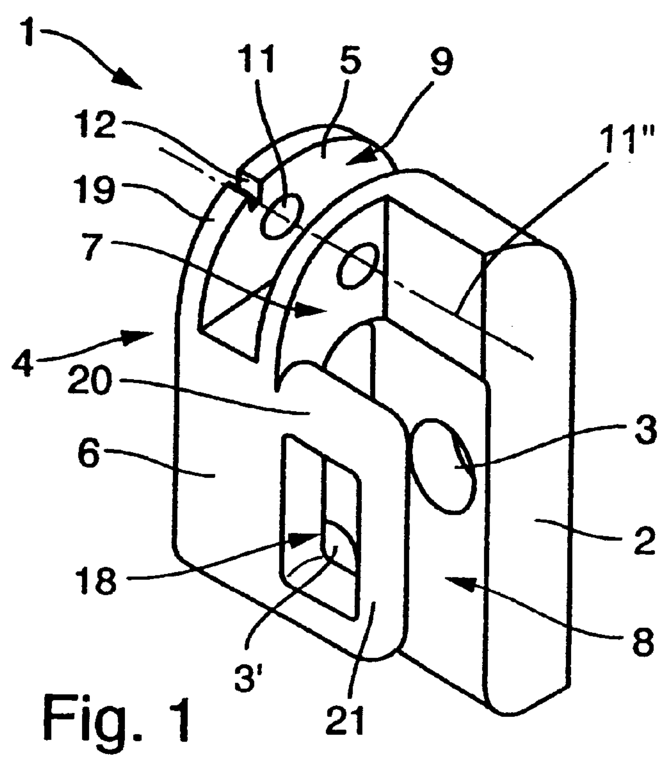
FIG. 1 is a perspective view of a connecting element in accordance with a first embodiment of the invention.

FIG. 1 shows a perspective view of a connecting element in accordance with a first embodiment of the invention. The connecting element 1 is intended to provide a detachable connection between two containers. To this end, it features a flat basic body element 2, in which, in this instance, two boreholes 3 and 3' are provided for. Inserted through these boreholes 3 and 3', which can be provided with internal threads, are screws, nails, or other pin-shaped elements, in order to connect the basic body element 2 with an object. Such an object may be, as indicated in the preamble, a backpack pocket, a bicycle pannier, any general type of container, a plug-in wall for technical equipment, or even a conventional wall. Instead of the boreholes 3 and 3', the basic body element 2 can also be connected by other means to an object, in which context in particular adhesive bonding, solder connection, or a tacked connection can be considered.

Provision is made on this basic body element 2 for a hook 4, essentially L-shaped in form, with a hook bow 5 and a hook body 6 running essentially parallel to the basic body element 2. In this context, the L-shaped hook 4 is provided in the area of the hook bow 5 with a lateral cutout 7. There accordingly remains a lateral cutout 20 in the hook body 6, which is connected to the basic body element 2 without a direct bow connection. With regard to the hook 4, which is already L-shaped in the side view, the L-shape of the hook 4 in the front view passes through the connection of the section 20, and the remaining hook bow 5 passes over a section of the hook 4, which in this case is at the bottom left.

The principle of such a connecting element which already contains all the necessary functional features is explained by way of the embodiments and in connection with the other drawings.

In particular, it will become clear that two identical connecting elements 1 can be used to connect two objects to one another. Specifically, in the situation in which the objects are located opposite one another, and the connecting elements 1 slide into one another, the hook body 6 of each of the connecting elements 1 engages with its section 20 in the slot 8, located between the hook body 6 and the basic body element 2, in which situation each hook body 6 engaged with its section beneath the hook bow 5 of the other connecting element 1. The thickness of the connection overall corresponds to the thickness of a hook 4 of the connecting elements 1, projecting beyond the basic body element 2.

Usually, objects of somewhat greater width are raised with at least two hooks, in order on the one hand not to overburden what would otherwise be the only hook, and, on the other, to avoid the occurrence of high forces which might lead to the two elements tipping over against one another. It is to advantage if the width of the cutout 7 corresponds essentially to half the width of the hook body 6. In particular, it can be seen from FIG. 1 that, if an object is retained or raised with two connecting elements 1, in each case half the hook bow 5 will be available as a support surface.

In addition to the simple suspension or raising of an object, it is in many applications of interest to provide protection against the inadvertent release of one object from another element, such as, for example, the securing of a bicycle pannier against a luggage carrier, of one part of a backpack of a two-part backpack assembly against the other, of a cable or strap secured to a connecting element against a tube or bar, or, in general, simply the securing of two connecting elements 1 to one another.

Figure 2:
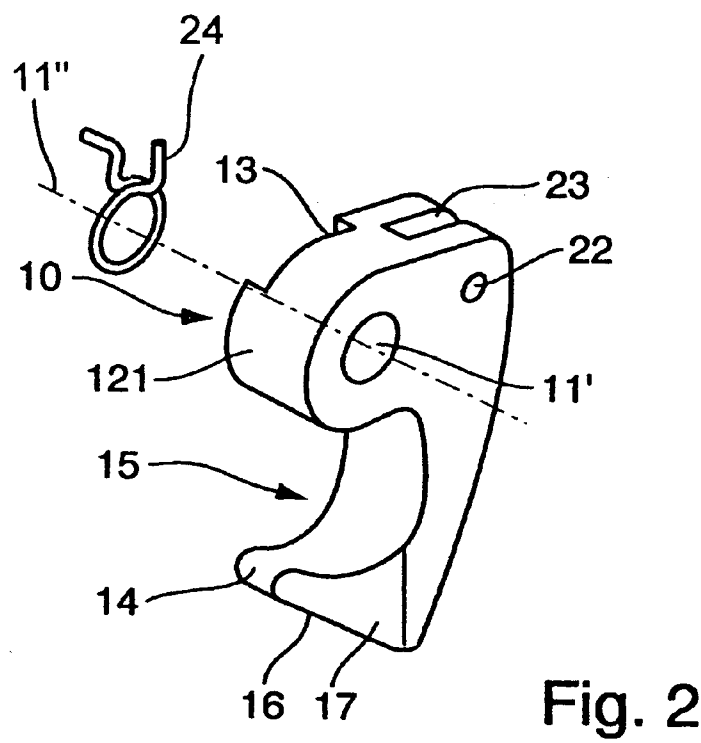
FIG. 2 is a perspective view of a locking bar for use with a connecting element in accordance with FIG. 1.

To do this, in the embodiment shown in FIG. 1, provision is made in the bow 5 of the L-shaped hook 4 and in the basic body element 2 for a longitudinal aperture 9, in which a locking bar 10 can be inserted, which is shown in FIG. 2. To allow for the rotational securing of the locking bar 10, provision is made in the hook bow 5 of the connecting element 1, according to FIG. 1, for a horizontal borehole 11 and a groove 12.

A pin, not shown in the drawings, is inserted into the boreholes 11, which likewise extends through a borehole 11' in the locking bar 10. In the head 121 of the locking bar 10, moreover, there is a lateral cutout 13. This allows for a spring to be pushed onto the pin, which can be supported on the one side against an edge of the cutout 13, and, on the other, against the groove 12. Naturally the spring 24 can also be supported in a small borehole provided in the side wall of the hook bow 5, instead of in the groove 12.

In this context, the locking bar 10 is jointed onto a horizontal axis 11 of the L-shaped hook 4, in which situation the locking bar can be pivoted against the force of a spring 24 provided on the axis into the area 8 between the hook 4 and the basic body element 2.

In the position of rest of the locking bar 10, the said bar adopts a position comparable to that in FIG. 2, i.e. its tip 14 rests to advantage against the inner wall of the hook body element 6. In this situation, the hollow space 15 of the locking bar 10 encompasses a tube or another longitudinal object, which is arranged at a second connecting element or forms this element.

The lower oblique edge 16 allows in the usual manner for such a connecting element to be slid in from below. The locking bar 10 is of particular advantage, however, due to the fact that on the side turned towards the cutout 7 a second oblique surface 17 is provided for, which allows the broad locking bar 10 to run tapering to its tip 14. The result of this is that the lateral insertion of a second connecting element is likewise possible, as will be described hereinafter in connection with FIG. 1.

In the case of the use of two identical connecting elements 1, as already referred to, the use of locking bars 10 may be desirable. This will then make it possible, for example, for two backpack pockets to be secured separately and with locking bars 10 securely to a bicycle, and for these to be connected together in another mode to form one single pannier. To this end, the hook body elements 6 are provided in the section beneath the cutout 7 with an aperture 19, the shape and size of which are designed especially to accommodate the locking bar 10 of a second connecting element 1. This leads to the situation in which the two webs 19 of the hook bow 5 have approximately the same thickness as the side peripheral areas of the section 20 located beneath the cutout 7.

If one connecting element 1 is now pushed into another connecting element 1, both lateral webs 21 of each connecting element 1 come in contact in each case against the lateral inclined surface 17. The user is therefore, by the lateral displacement of the connecting elements 1 into one another, pressing both the locking bars 10 backwards, which bend back against the spring force into the cutout 9 in the basic body element, and then engage in the aperture 18. Both objects are therefore connected to one another. To release the connection, the locking bar 10 is provided for in accordance with FIG. 2 with another borehole 22 running parallel to the borehole 11' and a groove 23' engaging over the borehole 22, to which a traction element can be secured with which the locking bar 10 can be drawn back out of the engagement, so that both objects can be separated from one another.

One instance of application for such connecting elements is the provision of container sets in general. These could be backpacks, bicycle panniers, sample cases, or similar. To advantage, these can indeed be suspended and secured to a carrier, such as a luggage carrier or a tube, only by the preferential two upper connecting elements 1. At the latest after the two containers have been connected, however, it is a good idea and to the purpose for the containers also to be connected to one another in the lower part.

Figure 3:
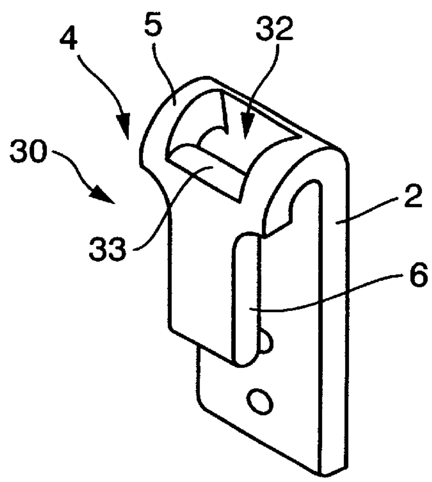
FIGS. 3 and 4 show a supplementary pair of connecting elements for use together with connecting elements in accordance with FIG. 1, as a container set.

To do this, a supplementary pair of connecting elements 30, 31 are provided for use together with connecting elements 1 according to FIG. 1 in a container set. Located on one of the containers of the container set are one or two of the hooks 30 according to FIG. 3, while on the other container of the container set the same number of hooks 31 according to FIG. 4 are provided for.

The connecting element 30 is provided with a basic body element 2 and a narrower hook body element 6. The basic body element 2 is connected to the narrower hook body element 6 by means of a hook bow 5, which is provided with an aperture 32 in the center, which features an offset edge 33, turned towards the hook body element 6, on which the lower edge of the hook 31 can rest, so that the upper side of the hooks feature the same height to one another on the containers.

Figure 4:
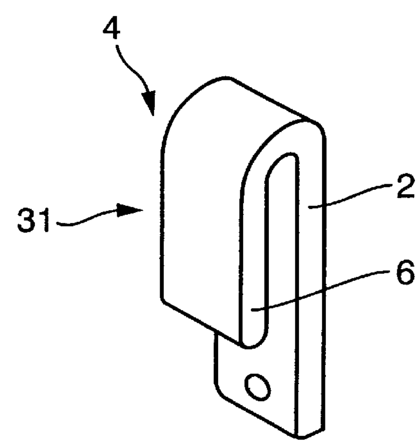

The complementary connecting element 31 according to FIG. 4 is a simple L-shaped hook 4, which is supplemented by the base body element 6 to form a "U". The complementary connecting element 31 is designed to be only wide enough for its hook body 6 to be passed through the aperture 32.

The function of these additional elements 30 and 31, in conjunction with the connecting elements according to FIG. 1, when used for two objects which are to be connected such as containers, is as follows: First, the lower edges of the objects are set against one another in such a way that the lower edges of the hook body element 6 of the complementary connection elements 31 are located at the aperture 32 of the connecting elements 30; the objects are then pushed in a vertical movement relative to one another, so that the connecting elements 30 and 31 slide into one another. In this situation, the connecting elements 1 on the objects are not taken into consideration, or possibly only inasmuch as, by reference to FIG. 1, the two cutouts 7 of the connecting elements which are to be linked are standing adjacent to one another. By way of the connection of the lower additional elements 30 and 31, the vertical height of the connecting elements 1 is provided essentially with a certain amount of play, with the result that it is now a simple matter for the user to shift the two objects essentially horizontal to one another, and in this way to move the individual connecting elements 1 in each case into one another, in which case the locking bars 10 are pushed away in the manner described, and then engage in the apertures 18.

The term "object", in the plural, as used herein, encompasses in this situation, in its feature of the creation of a releasable connection between two objects, on the one hand an object to which the connecting element is secured, or in which situation the connecting element is manufactured as one piece with the object, and, on the other, the isolated (second) object to which a first object, which is equipped with a connecting element, is secured in a releasable manner. Accordingly, the term "object" encompasses both a transportable container as well as a wall, a rod, a tube, or, seen in isolation, a fixed bicycle carrier, and in particular also without a (second) connecting element.

Figure 5:
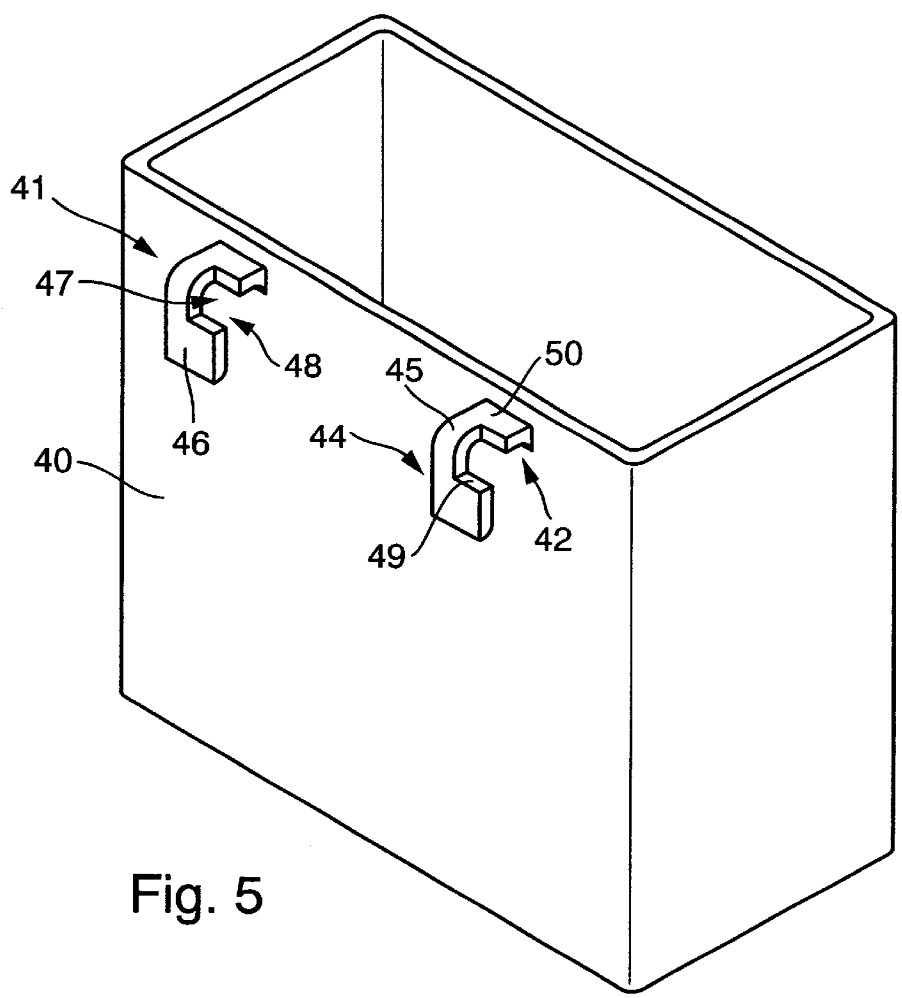
FIG. 5 is a perspective schematic view of a container open to the top with connecting elements in accordance with a second embodiment of the invention.

FIG. 5 shows a perspective schematic view of a container 40 open to the top, with connecting elements according to a second embodiment of the invention. The very simple drawing is applicable with a whole series of containers 40, e.g. with bicycle panniers or beverage crates. In the latter case, the drawing corresponds to the representation of a 6×1-liter bottle refundable crate, in which, in each case, three bottles are placed in two rows in the container 40.

The components of the connecting elements according to this embodiment are provided with reference designations from 42, in which situation attention has been paid to concordance with the designations in FIG. 1. The connecting element 41 is provided with a hook body 46, which passes via a hook bow 45 into the container 40. Accordingly, the basic body element 42 of the connecting element 41 is integrated into the container 40. As in the embodiment of the connecting element 1 according to FIG. 1, is a lateral cutout 47 and a slot 48 between the container 40 and the hook body 46. In order to obtain sufficient space in the width of the slot 48 for the hook section 49 which is to be slid beneath it, a web 50 is provided on the hook bow 45, which is secured to the container 40. In another embodiment, this may be reduced in size, or, with an appropriate design of the hook bow 45, it may be done away with altogether.

When in function, it is possible, on the one hand, in this case for two containers 40 to be pushed laterally against one another, in order to create a connection such that the containers can be carried by a handle, and, on the other, each container 40 can be suspended individually on another object such as a bar or similar device above the slot 48.

Figure 6:
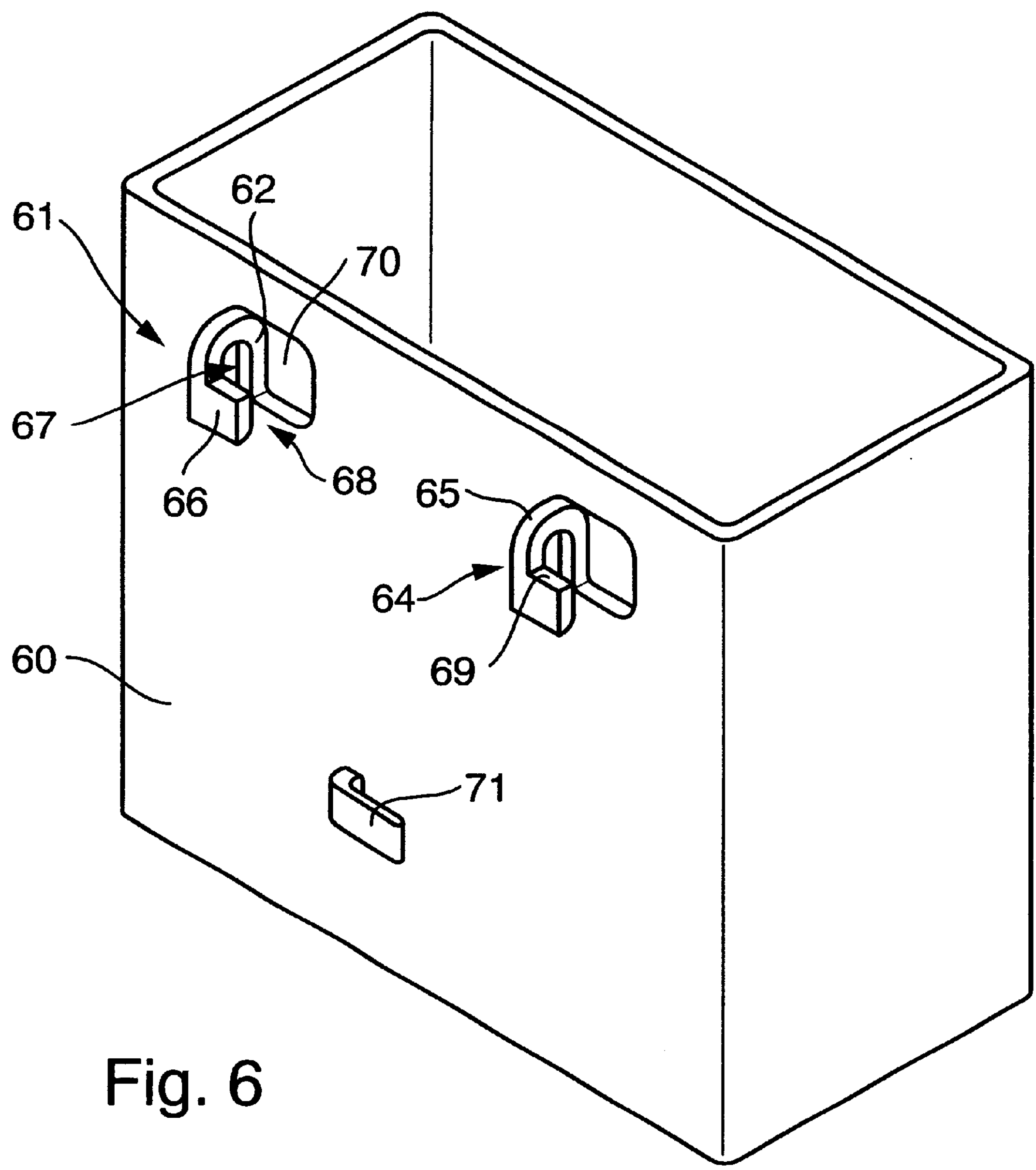
FIG. 6 is a perspective schematic view of a container open to the top with connecting elements in accordance with a third embodiment of the invention.

FIG. 6 shows a further embodiment of the invention in a perspective schematic view of another container open to the top, with connecting elements according to the invention.

The components of the connecting elements according to this embodiment are designated by reference numbers from 61, in which situation attention has been paid to achieving concordance with the designations of FIGS. 1 and 5. The connecting element 61 is provided with a hook body 66, which passes into the container 60 via a hook bow 65. Accordingly, the basic body element 62 of the connecting element 61 is integrated into the container 60. As with the embodiment of the connecting element 1 according to FIG. 1, a lateral cutout 67 and a slot 68 are provided between the container 60 and the hook body element 66. In addition to this, provision is made for an aperture 70 in the basic body element 62 integrated in the container 60, in which situation its width somewhat exceeds the width of the hook body element 66, whereby, when the two containers 60 are pushed into one another, the hook 64 with the hook bow 65 and the hook body 66 can be introduced through the aperture. In this context, the hook body 66 is pushed forward until it comes in contact with the hook body 66 of the connecting element 61 allocated to it.

Finally, provision is made for a lower transverse hook 71, which also provides for a connection of the lower section of the container 61. Opposite this is an aperture in a second container 60. This solution represented, however, has the disadvantage that not all containers 60 can be of identical design, so allowing them to be used in pairs as bags. For use with automatically processed beverage crates, this hook 71 should be omitted.

Finally, the containers from FIG. 6 and, of course, other objects with connecting elements apparent to the person skilled in the art, can additionally be provided with locking bars. In this situation, in the simplest embodiment, this can be provided in the form of a spring-actuated wedge, the wedge surface of which is pushed back, corresponding to the surfaces 16 and/or 17 of the locking bar 10, when the containers are pushed into one another, until it snaps into place. In this situation, the release lever can be manufactured in one piece with the container, e.g. in the area of a reinforced section of the container, which, in situations involving containers open to the top, such as beverage crates, the user automatically grasps when pulling the crate halves apart, and actuates accordingly to release the connection.

In addition to the embodiments of the connecting elements described, and of the objects with connecting elements, which for preference are integrated with the objects, other current applications will naturally be appraised by the person skilled in the art, and, in particular, the connecting set of two connecting elements 1, which when assembled form a flat unit. If required, they can be separated and connected with the rear faces to one another, and can then be used, for example, on the one hand, to hook an object provided with a bar, and, on the other hand, to secure this object to the luggage carrier of a bicycle, for example.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

I claim:

1. A connecting element to provide a separable connection of two objects with one another, comprising a basic body element (2, 42, 62) and an essentially L-shaped hook (4, 44, 64) extending from the body element, said hook comprising a short leg in a form of a hook bow (5, 45, 65) and a long leg in a form of a hook body (6, 46, 66), a major plane of the hook body running essentially parallel to the body element (2, 42, 62), the hook bow extending essentially perpendicular to the hook body and the body element to connect the hook body with the body element, and the hook (4, 44, 64) having a lateral cutout (7, 47, 67) in an area of the hook bow (5, 45, 65), such that a lateral width of the hook bow is narrower than a lateral width of the major plane of the hook body, wherein a longitudinal aperture (9) is provided in the bow (5) of the L-shaped hook (4) and in the basic body element (2), in which a locking bar (10) is located, the locking bar (10) being jointed to a horizontal axis (11") of the L-shaped hook (4), in which situation the locking bar (10) can be pivoted inwardly against a force of a spring (24) provided on the axis (11") into a space (8) between the hook body (6) and the basic body element (2).

2. The connecting element according to claim 1, wherein the width of the cutout (7, 47, 67) corresponds essentially to half the width of the hook body (6, 46, 66).

3. The connecting element according to claim 1, wherein the hook body (6) is provided with an aperture (18) in a section (20) located beneath the cutout (7), the shape and size of the said aperture being designed especially to accommodate the locking bar (10) of a second connecting element.

4. The connecting element according to claim 1, wherein the connecting element (41) is integrated with its basic body element (2) in an object (40).

5. The connecting element according to claim 1, wherein the connecting element (61) is integrated with its basic body element (62) in an object (60), and the basic body element (62) integrated in the object (60) is provided with an aperture (70), through which the hook (64) of a second connecting element can be introduced.

6. A connecting element to provide a separable connection of two objects with one another, comprising a basic body element (2, 42, 62) and an essentially L-shaped hook (4, 44, 64) extending from the body element, said hook comprising a short leg in a form of a hook bow (5, 45, 65) and a long leg in a form of a hook body (6, 46, 66), the hook body (6, 46, 66) being spaced from the basic body element (2, 42, 62), a major plane of the hook body running essentially parallel to the body element (2, 42, 62), the hook bow extending essentially perpendicular to the hook body and the body element to connect the hook body with the body element, and the hook (4, 44, 64) having a lateral cutout (7, 47, 67) in an area of the hook bow (5, 45, 65), such that a lateral width of hook bow is narrower than a lateral width of the major plane of the hook body, wherein the width of the lateral cutout corresponds to half a width of the hook body.

7. A first connecting element to provide a separable connection of two objects with one another, comprising a basic body element (2, 42, 62) and an essentially L-shaped hook (4, 44, 64) extending from the body element, said hook comprising a short leg in a form of a hook bow (5, 45, 65) and a long leg in a form of a hook body (6, 46, 66), the hook body (6, 46, 66) being spaced from the basic body element (2, 42, 62), a major plane of the hook body running essentially parallel to the body element (2, 42, 62), the hook bow extending essentially perpendicular to the hook body and the body element to connect the hook body with the body element, and the hook (4, 44, 64) having a lateral cutout (7, 47, 67) in an area of the hook bow (5, 45, 65), such that a lateral width of hook bow is narrower than a lateral width of the major plane of the hook body, wherein the lateral cutout extends half a width of the first connecting element so that the first connecting element is capable of engaging a second connecting element, identical to the first connecting element, by inserting the L-shaped hook of the second connecting element between the hook body and the L-shaped hook of the first connecting body, wherein when the second connecting element is engaged with the first connecting element, the hook bow of the first connecting element abuts the hook bow of the second connecting element.

* * * * *